(12) United States Patent
Takasawa

(10) Patent No.: US 8,042,129 B2
(45) Date of Patent: Oct. 18, 2011

(54) DISK RECORDING AND/OR REPRODUCING DEVICE

(75) Inventor: Takeharu Takasawa, Kanagawa (JP)

(73) Assignee: Sony Corporation, Tokyo (JP)

(*) Notice: Subject to any disclaimer, the term of this patent is extended or adjusted under 35 U.S.C. 154(b) by 710 days.

(21) Appl. No.: 12/152,995

(22) Filed: May 19, 2008

(65) Prior Publication Data

US 2008/0301724 A1 Dec. 4, 2008

(30) Foreign Application Priority Data

May 30, 2007 (JP) ................................ 2007-144182

(51) Int. Cl.
*G11B 33/14* (2006.01)

(52) U.S. Cl. ...................................................... 720/655

(58) Field of Classification Search .................. 720/655, 720/603, 648, 602, 644, 649, 609, 713, 601, 720/608, 639, 619, 646
See application file for complete search history.

(56) References Cited

U.S. PATENT DOCUMENTS

| 6,820,272 B2 * | 11/2004 | Wang | 720/600 |
| 2004/0205800 A1 * | 10/2004 | Wang | 720/703 |
| 2008/0295123 A1 * | 11/2008 | Fujimoto et al. | 720/649 |
| 2009/0113465 A1 * | 4/2009 | Tsuji | 720/728 |

FOREIGN PATENT DOCUMENTS

| JP | 09-017082 A | 1/1997 |
| JP | 2002-298567 A | 10/2002 |
| JP | 2005-209305 A | 8/2005 |

* cited by examiner

*Primary Examiner* — Allen Cao
(74) *Attorney, Agent, or Firm* — Wolf, Greenfield & Sacks, P.C.

(57) ABSTRACT

A disk recording and/or reproducing device includes a disk tray having a concave disk housing portion for putting in and taking out a disk-like recording medium; a tray housing case supporting the disk tray so as to be movable in a direction in which the disk tray is inserted and ejected; and a disk cover mounted to the tray housing case and covering over the disk housing portion of the disk tray when the disk tray is housed in the tray housing case. The disk cover includes an annular contact portion at an outer periphery thereof, extending outwardly and continuous in a circumferential direction thereof, a dimension of a width of the annular contact portion is larger than that of a thickness of the disk cover, and the annular contact portion is brought into contact with an entire periphery of the disk housing portion of the disk tray.

6 Claims, 14 Drawing Sheets

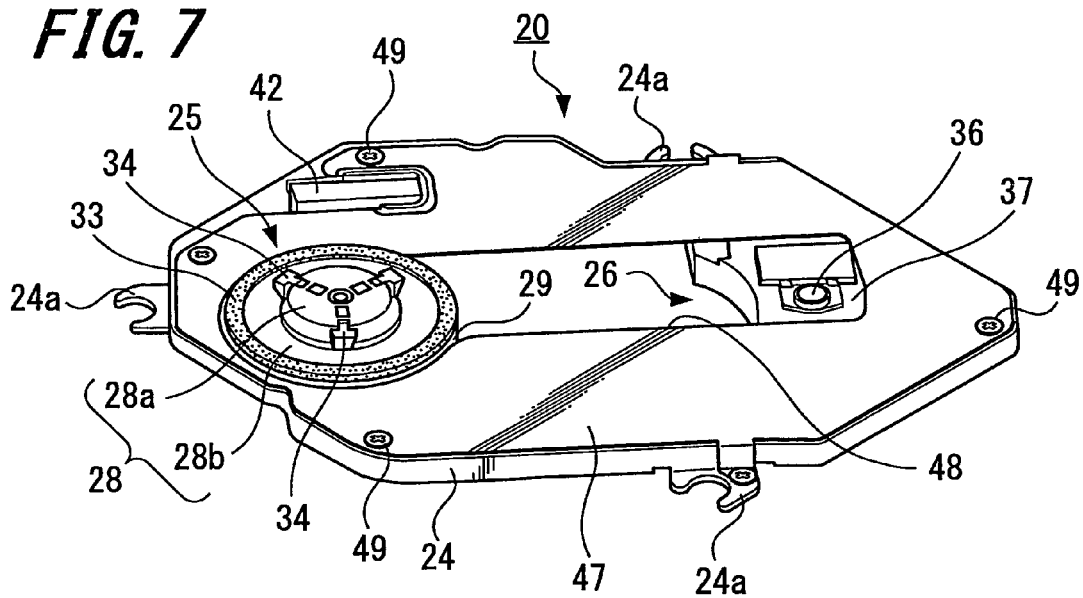
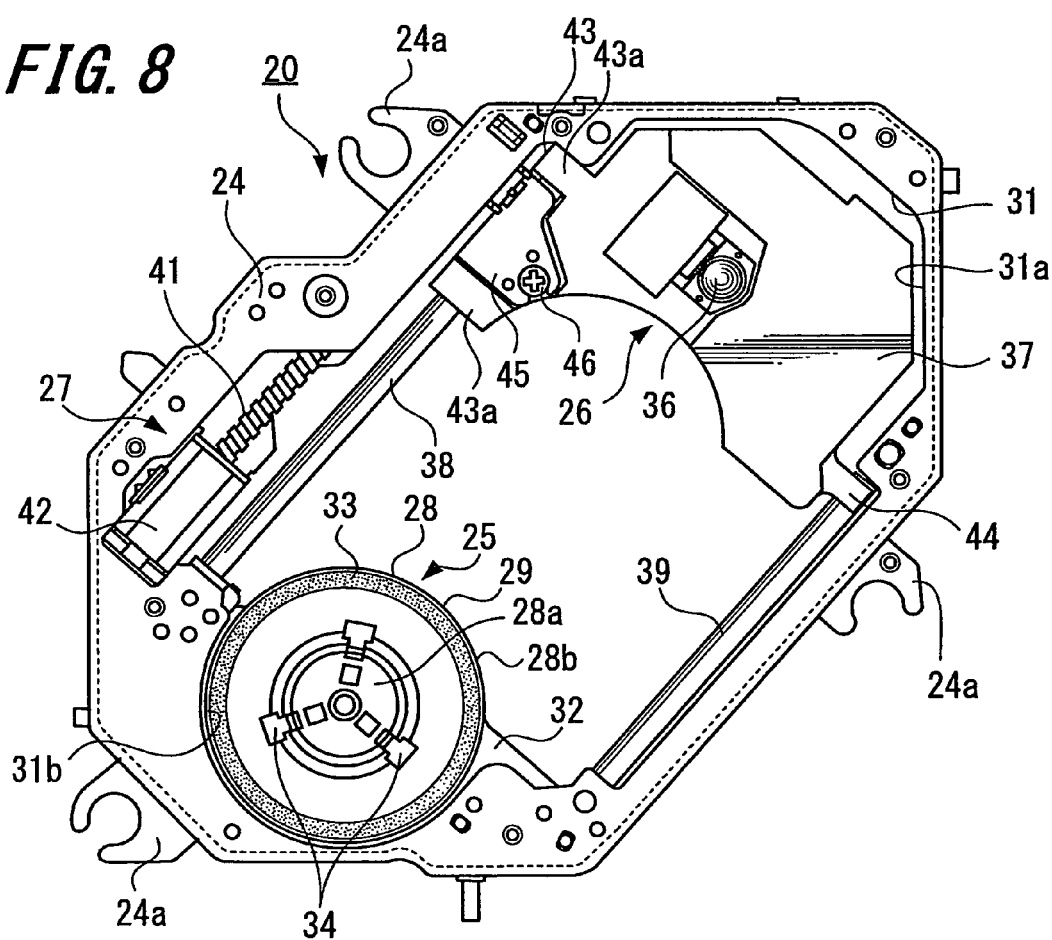

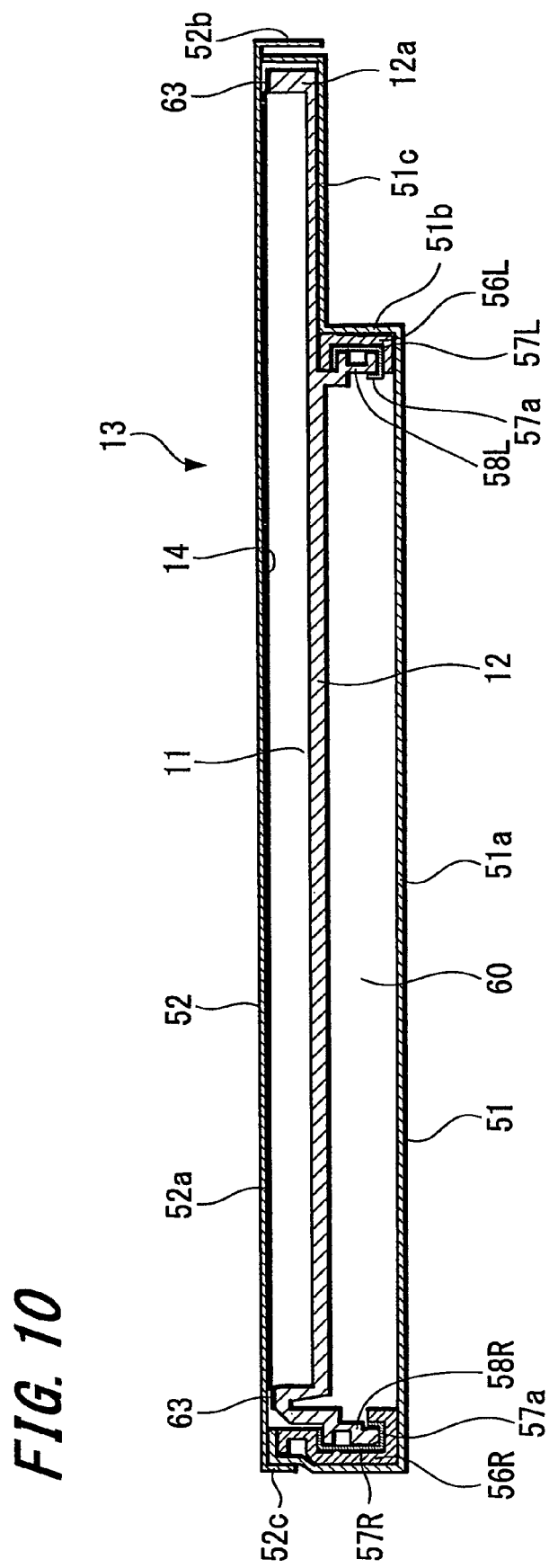

DISK RECORDING AND/OR REPRODUCING DEVICE

CROSS REFERENCES TO RELATED APPLICATIONS

The invention contains subject matter related to Japanese Patent Application JP 2007-144182 filed in the Japanese Patent Office on May 30, 2007, the entire contents of which being incorporated herein by reference.

BACKGROUND OF THE INVENTION

1. Field of the Invention

The invention relates to a disk recording and/or reproducing device having a configuration that a disk housing portion of a disk tray, having a concave shape for housing a disk-like recording medium, is covered by a disk cover.

2. Description of the Related Art

A known disk recording and/or reproducing device of this sort is disclosed, for example, in Japanese Unexamined Patent Application Publication No. 2003-68051. Japanese Unexamined Patent Application Publication No. 2003-68051 discloses an optical disk device including a disk drive device capable of preventing occurrence of vibration when a disk is rotated at a high speed. The optical disk device disclosed in Japanese Unexamined Patent Application Publication No. 2003-68051 is "an optical disk device having a configuration in which a disk is placed on a disk placement portion of a tray in a non-operating position and thereafter, when the tray is shifted to an operating position, the disk is placed on a turn table", and the disk drive device of the optical disk device is characterized in that "a disk-like cover for covering a disk surface when the tray is in the operating position is provided over the disk".

According to the disk drive device of the optical disk device having the above-described configuration (hereinafter referred to as the "first related art"), such an effect is expected that "since the affect of air current to disk rotation can be minimized, the disk rotation characteristic can be improved" (paragraph [0019] of the specification).

Another known disk recording and/or reproducing device is disclosed, for example, in Japanese Unexamined Patent Application Publication No. 09-17082. Japanese Unexamined Patent Application Publication No. 09-17082 discloses an optical disk drive device that suppresses attachment of dust to an optical disk recording medium and an optical pickup as much as possible. The optical disk drive device disclosed in Japanese Unexamined Patent Application Publication No. 09-17082 is "a tray-loading-type optical disk drive device having a disk tray that slides on a front surface and an interior surface of a case, in a horizontal direction, through a front opening portion of the case, so as to be freely put in and drawn out from the case, while an optical disk recording medium is being placed thereon in a detachable manner", and the disk drive device is characterized in "including a cover for covering the optical disk recording medium from a top surface through a side surface thereof when the disk tray is housed in the case in a space relative to the disk tray, and a driving mechanism for suppressedly biasing the cover from above to the disk tray".

According to the optical disk drive device having the above-described configuration (hereinafter referred to as the "second related art"), such an effect is expected that "the attachment of dust to an optical disk recording medium and an optical pickup can be remarkably reduced while adopting a tray-loading-type optical disk device" (paragraph [0032] of the specification).

FIG. 1 is a diagram for explaining the above-described first related art. In FIG. 1, a reference numeral 100 denotes a disk, a reference numeral 101 denotes a tray, a reference numeral 102 denotes a disk-like cover, and a reference numeral 103 denotes a support member. The tray 101 includes a disk housing portion 104 formed in a circular concave shape in which and from which the disk 100 can be placed and taken out. In the disk housing portion 104, the disk 100 is placed on a not-shown turn table and is rotatably supported. All of the disk housing portion 104 is covered by the disk-like cover 102.

Although not shown, the disk-like cover 102 is rotatably supported by a support member 103 together with a clamp member placed to face the turn table. An outer periphery of the disk-like cover 102 is provided with a side surface portion 102a continuously formed in an annular shape. A continuous ring-shaped tip end face of the side surface portion 102a of the disk-like cover 102 is brought into contact with a circumference of the disk housing portion 104 provided on a main surface of the tray 101.

In the first related art, the disk-like cover 102 for covering a disk surface of the disk 100 is provided above the disk 100 to control the air current involved in disk rotation, and thereby an affect given to disk rotation by the air current is minimized and the disk rotation characteristic is enhanced. However, since the continuous ring-shaped tip end face of the side surface portion 102a of the disk-like cover 102 is opposed to the main surface of the tray 101 and the area of the tip end face of the side surface portion 102a is relatively small, a space tends to be created between the tip end face of the side surface portion 102a of the disk-like cover 102 and the main surface of the tray 101. Accordingly, the air current involved in a rotation of the disk 100 flows through the space between the side surface portion 102a of the disk-like cover 102 and the main surface of the tray 101, resulting in causing a problem that a noise level due to the air current becomes relatively high.

In the second related art, although a disk-like cover for covering the optical disk placed on the disk tray from the top through the side portion is provided to prevent invasion of dust with the cover, the circumference portion of the cover is bent downwardly to have the end surface of the circumference portion opposed to the main surface of the tray. Therefore, as in the first related art, due to a small area of the end surface of the circumference portion of the cover opposed to the main surface of the tray, a space tends to be created between the circumference portion of the cover and the main surface of the tray 101. As a result, the air current involved in disk rotation flows through the space between the circumference portion of the cover and the main surface of the tray 101 to similarly cause a problem of a high noise level due to the air current.

SUMMARY OF THE INVENTION

The inventors of the invention have recognized that in related art disk recording and/or reproducing devices, although a cover for preventing dust or the like from invading into a disk housing portion is provided, because the area of an outer periphery (or a circumference portion) of the cover, opposed to the main surface of the disk tray, is relatively small, the air current involved in disk rotation flows through a space between the outer periphery (or the circumference portion) of the cover and the main surface of the disk tray, thus resulting in causing a relatively high noise level due to the air current.

According to an embodiment of the invention, a disk recording and/or reproducing device includes a disk tray having, in a main surface thereof, a concave disk housing portion in which and from which a disk-like recording medium can be put and taken out; a tray housing case for supporting the disk tray so as to be movable in direction in which the disk tray is inserted and ejected; and a disk cover which is mounted to the tray housing case and which covers over the disk housing portion of the disk tray when the disk tray is housed in the tray housing case. The disk cover includes an annular contact portion provided at an outer periphery thereof, extending outwardly and continuous in a circumferential direction thereof, a dimension of a width of the annular contact portion in a direction orthogonal to the circumferential direction thereof is larger than a dimension of a thickness of the disk cover, and the disk cover is configured such that the annular contact portion is brought into contact with an entire periphery of the disk housing portion of the disk tray.

According to the disk recording and/or reproducing device of the embodiment of the invention, the dimension of the width of the annular contact portion in a direction orthogonal to the circumferential direction thereof is larger than the dimension of the thickness of the disk cover, and the annular contact portion is brought into contact with an entire periphery of the disk housing portion of the disk tray. Accordingly, the space between the disk cover and the disk tray can be eliminated or can be made small as much as possible, thereby preventing or suppressing the air current from flowing through the space and preventing the noise level due to the air current flowing through the space from increasing. As such, the noise level caused by rotation of the disk-like recording medium can be decreased.

BRIEF DESCRIPTION OF THE DRAWINGS

FIG. 7 is a perspective view illustrating an example of a drive unit of the disk drive device according to the embodiment of the invention.

FIG. 8 is a plan view of the drive unit of the disk drive device according to the embodiment of the invention.

FIG. 10 is a cross sectional view of the disk drive device according to the embodiment of the invention.

FIG. 16B illustrates a state that the disk tray has been inserted into the tray housing case.

DESCRIPTION OF THE PREFERRED EMBODIMENTS

A disk recording and/or reproducing device in which invasion of dust or the like into a disk housing portion can be avoided and a noise level caused by rotation of a disk-like recording medium can be decreased was realized in a relatively simple construction by providing an annular contact portion to an outer periphery of a disk cover and by making the dimension of the width of the annular contact portion larger than the dimension of the thickness of the disk cover.

Figure 2:
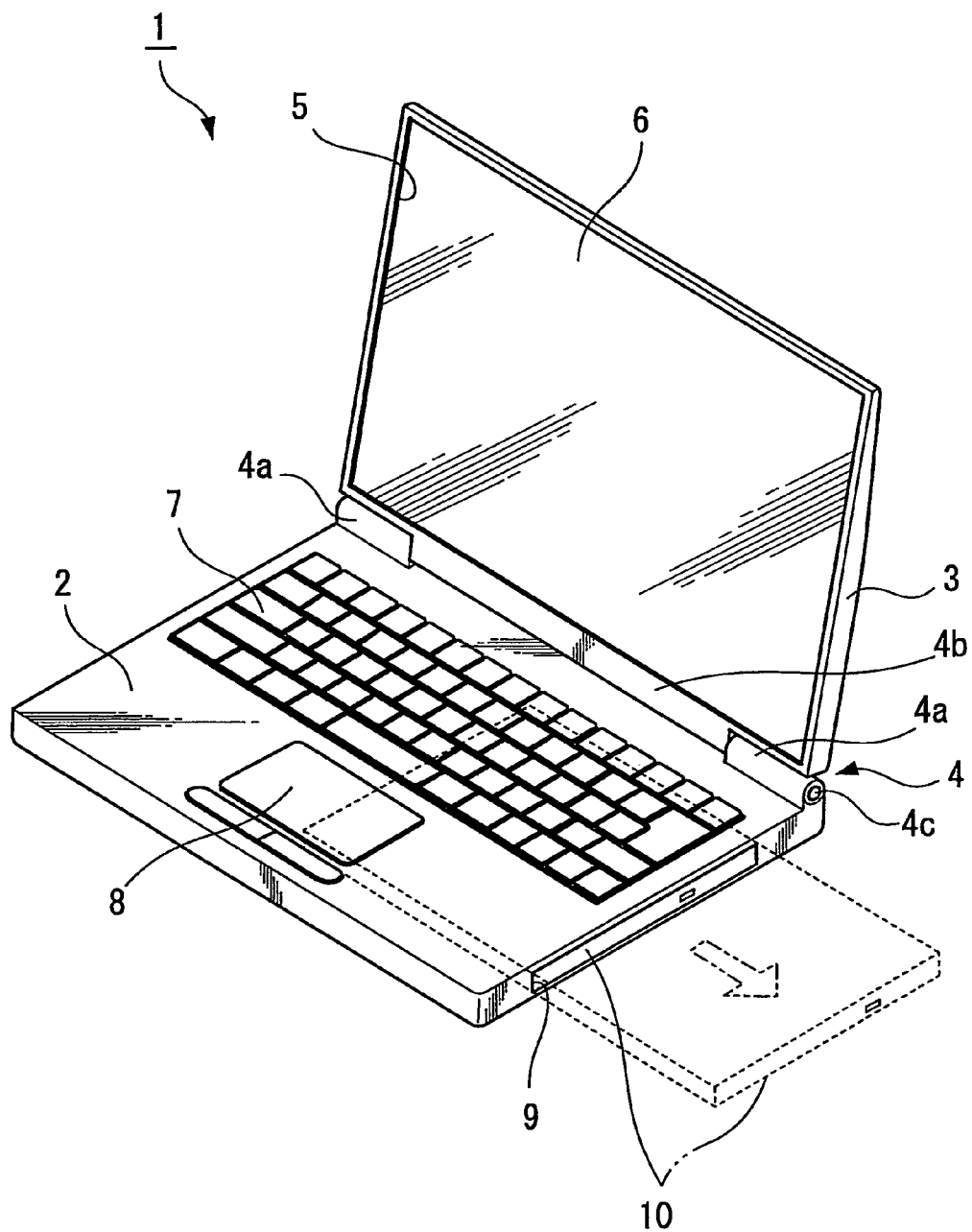
FIG. 2 is a perspective view of a laptop personal computer (laptop computer) as an example of a disk recording and/or reproducing device according to an embodiment of the invention.
Figure 3:
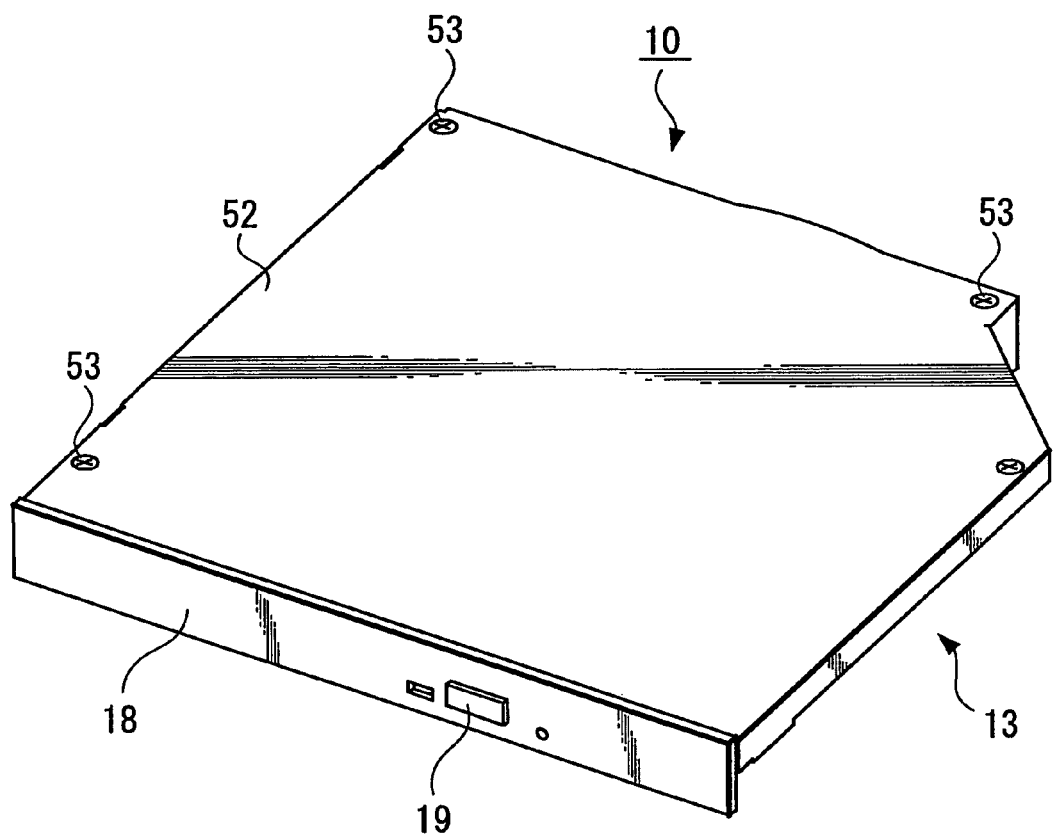
FIG. 3 is a perspective view illustrating an appearance of an example of a disk drive device of the disk recording and/or reproducing device according to the embodiment of the invention.
Figure 4:
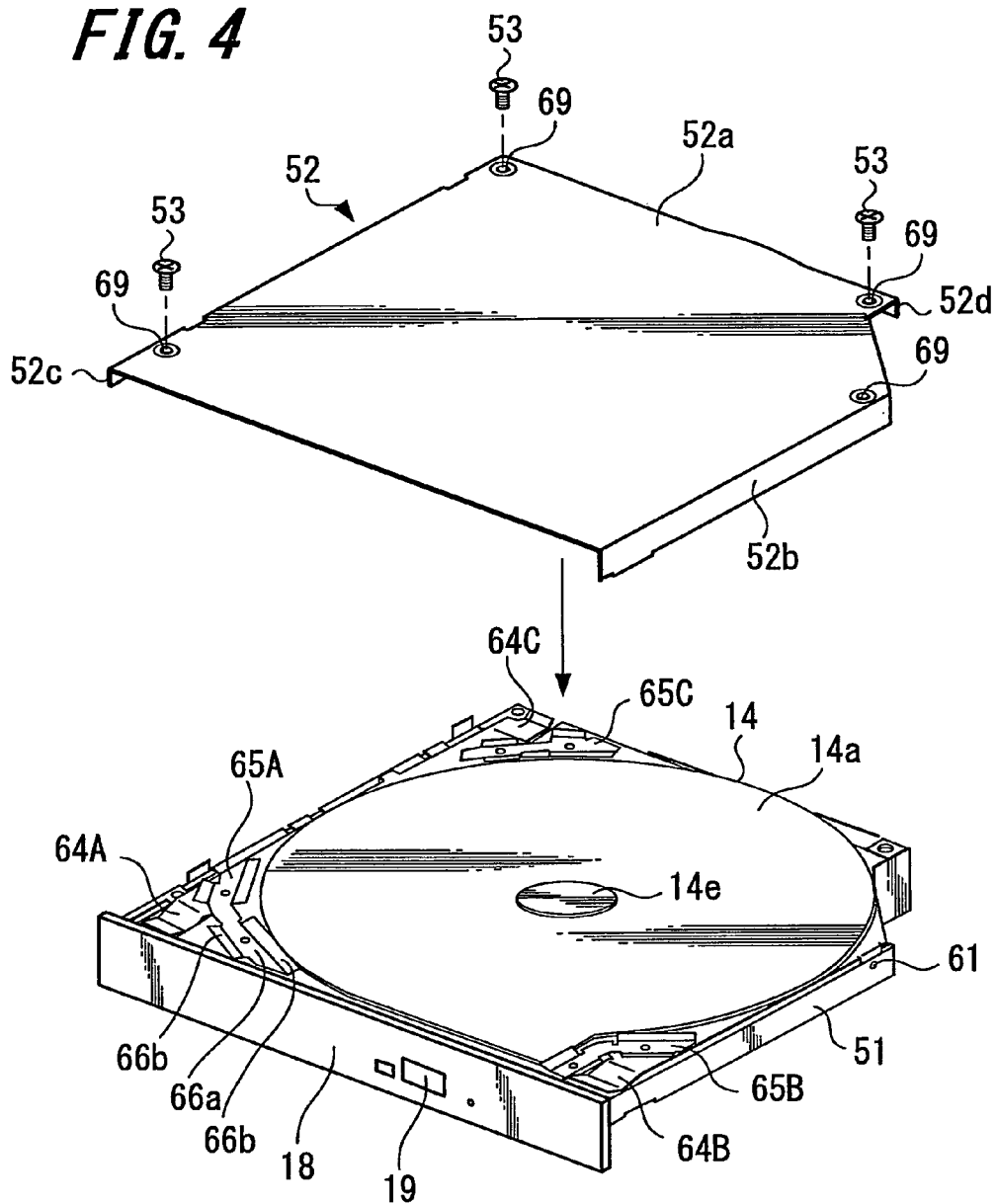
FIG. 4 is a perspective view illustrating an appearance of the disk drive device of FIG. 3 with a top cover thereof disassembled.
Figure 5:
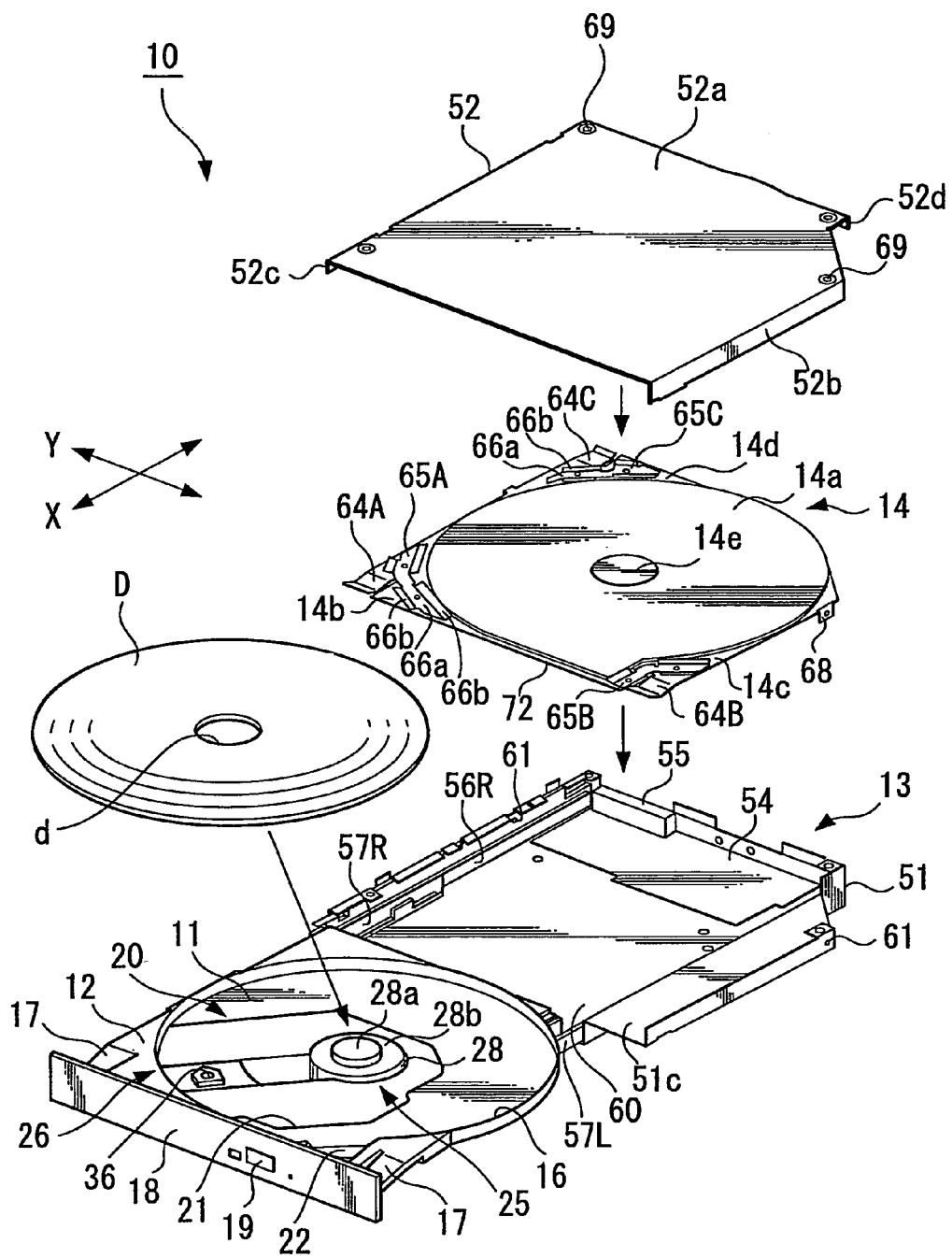
FIG. 5 is an exploded perspective view of the disk drive device of FIG. 3.
Figure 6:
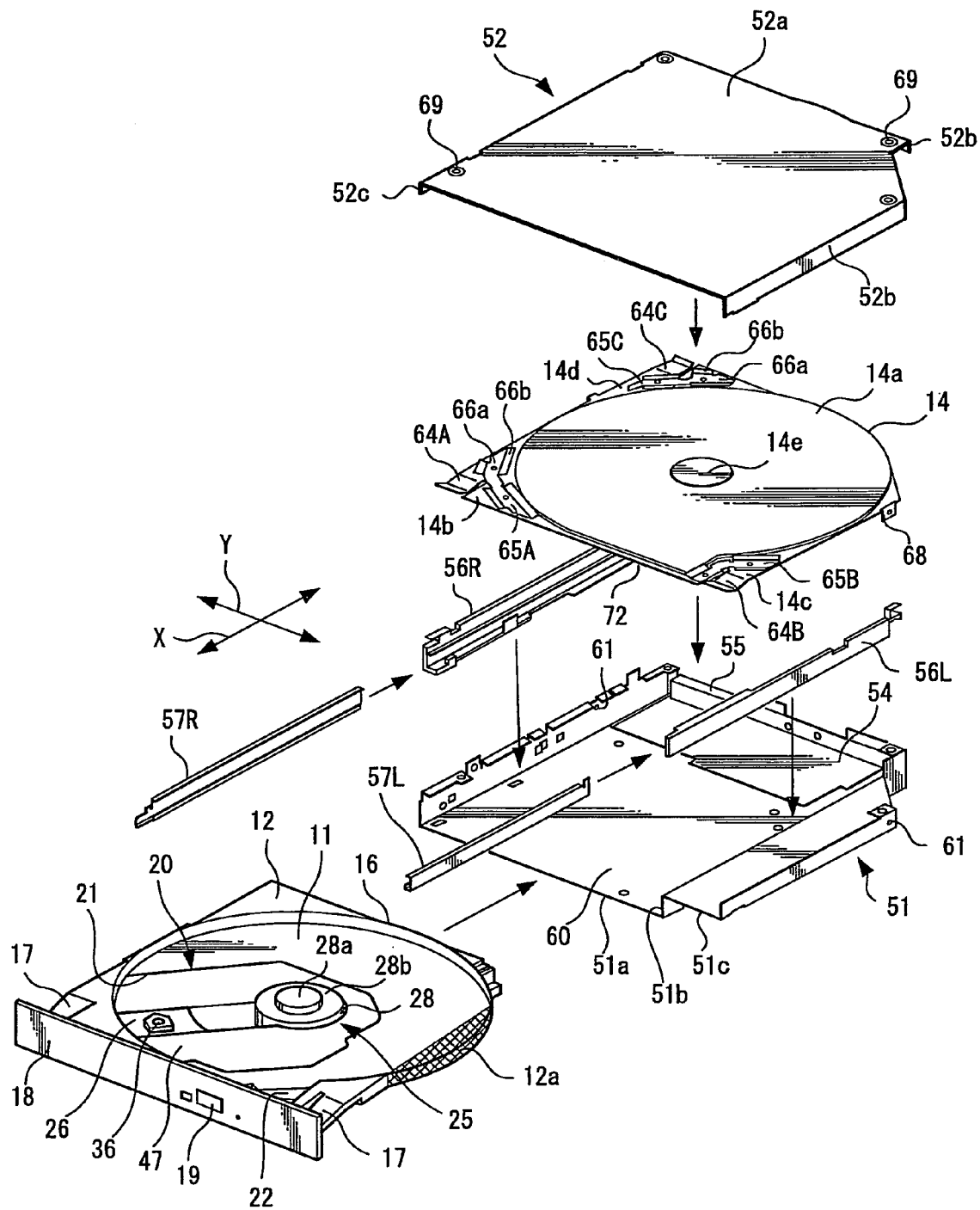
FIG. 6 is another exploded perspective view of the disk drive device with guide rails and fixed rails disassembled.

FIGS. 2 to 17 illustrate an example of an embodiment of the invention. That is, FIGS. 2 to 17 illustrate an example of a disk recording and/or reproducing device according to the embodiment of the invention. FIG. 2 is a perspective view of a laptop personal computer as an example of the disk recording and/or reproducing device according to the embodiment of the invention; FIG. 3 is a perspective view illustrating an appearance of a disk drive device of the laptop personal computer; FIG. 4 is a perspective view illustrating an appearance of the disk drive device with a top cover thereof disassembled; FIG. 5 is an exploded perspective view of the disk drive device; FIG. 6 is another exploded perspective view of the disk drive device illustrated in FIG. 5 with guide rails and fixed rails disassembled; FIG. 7 is a perspective view of a drive unit of the disk drive device; and FIG. 8 is a plan view of the drive unit.

Figure 9:
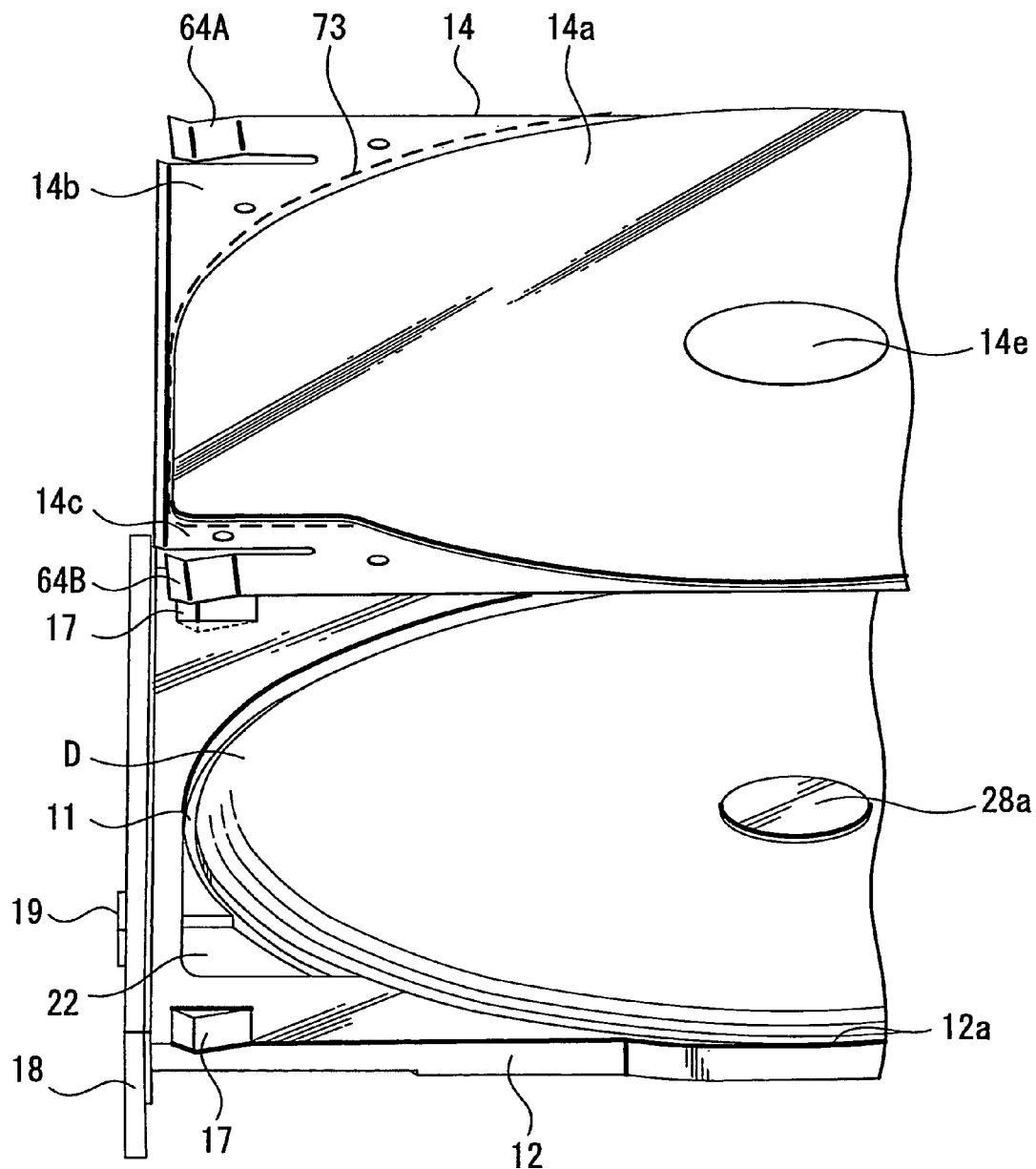
FIG. 9 is an explanatory diagram illustrating main portions of a disk tray and a disk cover of the disk drive device according to the embodiment of the invention.
Figure 11A:
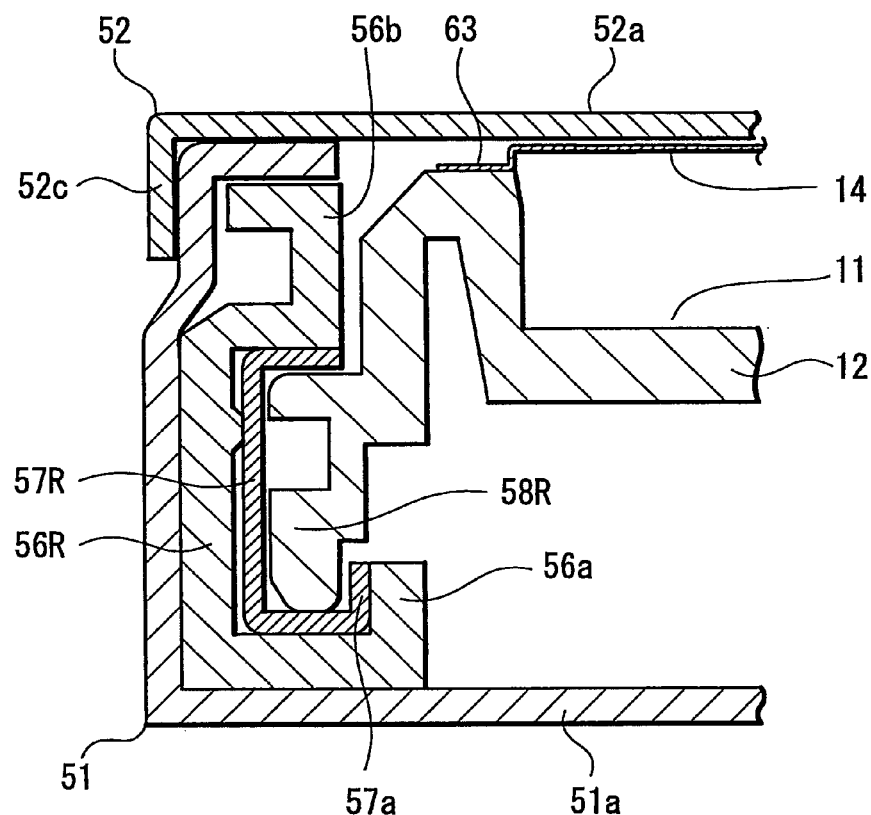
FIGS. 11A and 11B are enlarged cross sectional views of the main portions of FIG. 10, FIG. 11A being a cross sectional view of a second fixed rail side, and FIG. 11B being a cross sectional view of a first fixed rail side.
Figure 11B:
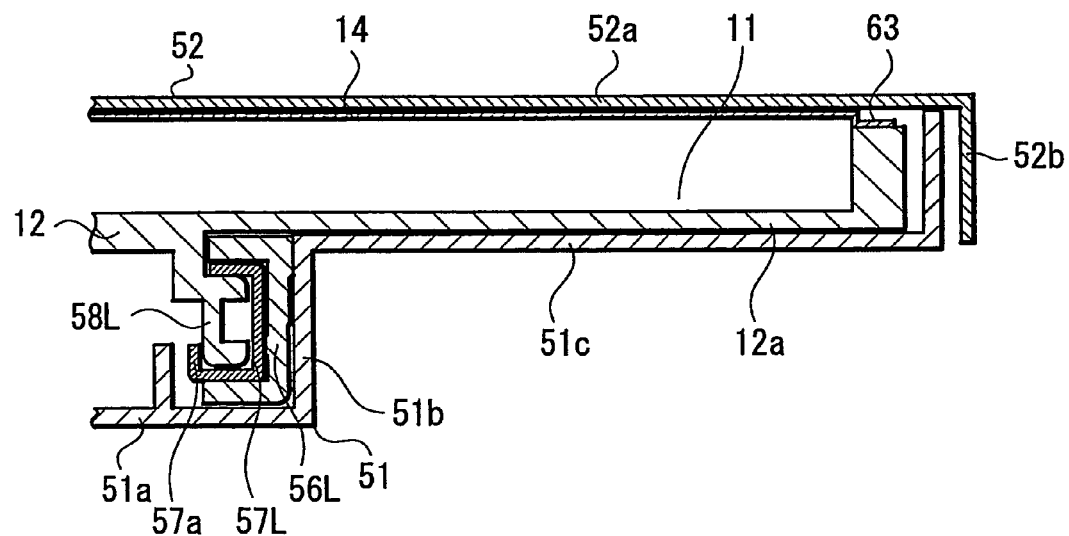
Figure 12:
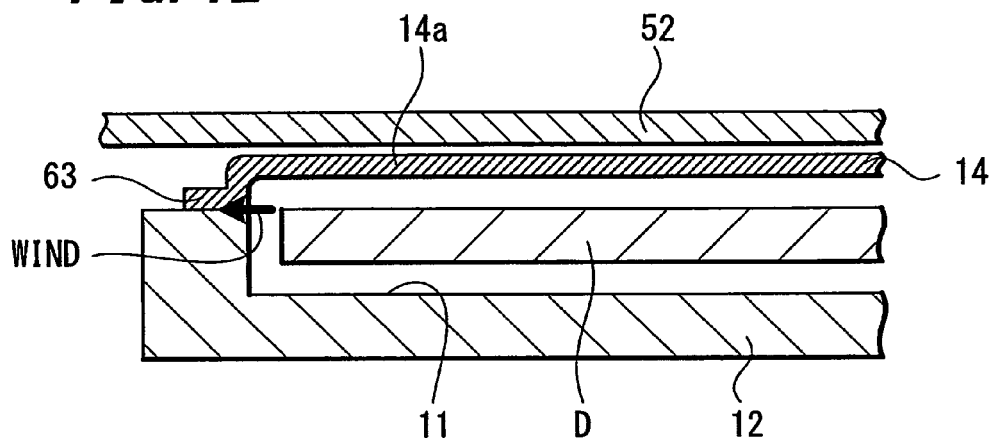
FIG. 12 is an explanatory diagram illustrating a contact portion between the disk tray and the disk cover of the disk drive device according to the embodiment of the invention.
Figure 13:
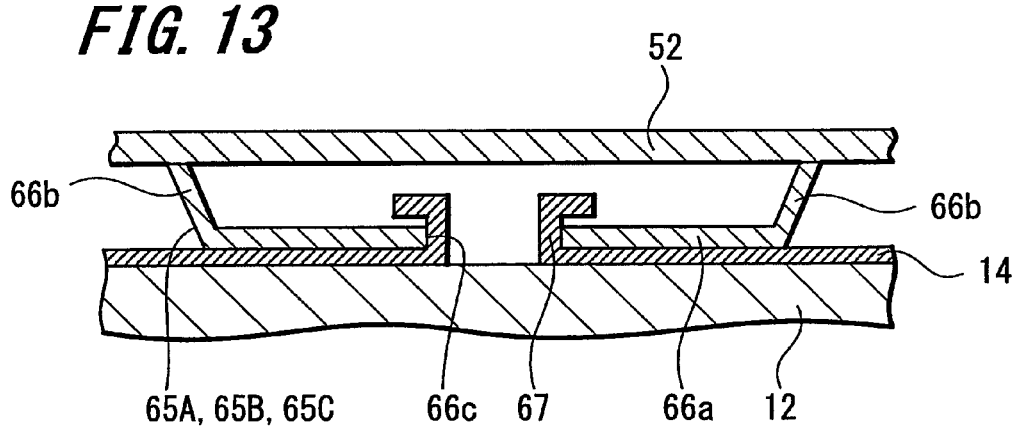
FIG. 13 is an explanatory diagram illustrating an example of an elastic member mounted on the disk cover of the disk drive device according to the embodiment of the invention.
Figure 14:
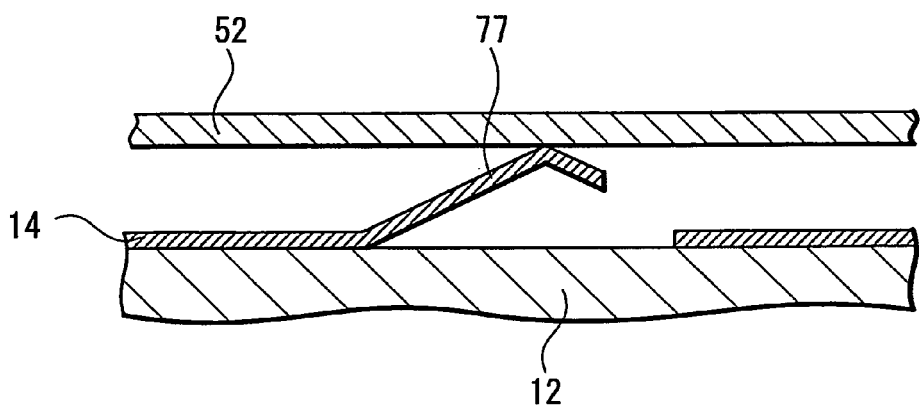
FIG. 14 is an explanatory diagram illustrating another example of the elastic member mounted on the disk cover of the disk drive device according to the embodiment of the invention.
Figure 15:
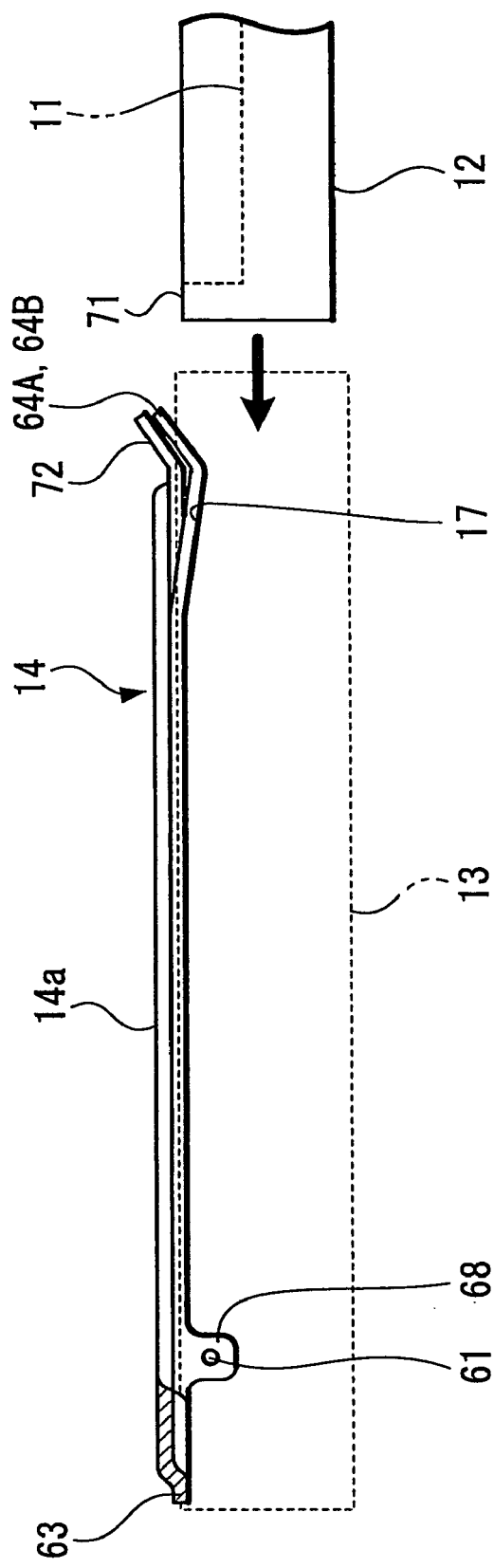
FIG. 15 is an explanatory diagram illustrating a state before the disk tray is installed into a tray housing case of the disk drive device.
Figure 16:
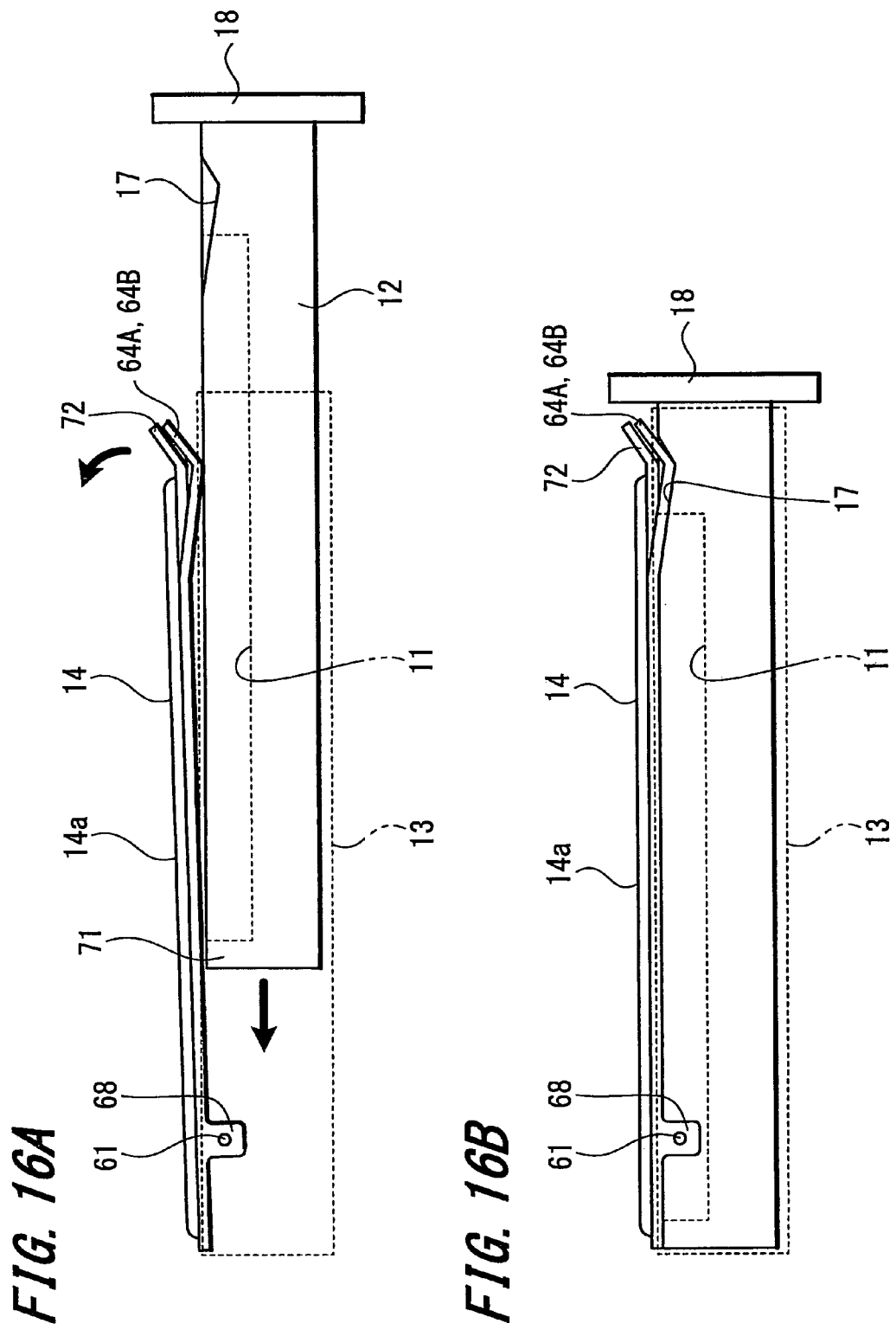
FIGS. 16A and 16B are explanatory diagrams illustrating states of installing the disk tray into the tray housing case, FIG. 15A illustrating a state that the disk tray is on its way of being inserted into the tray housing case.
Figure 17:
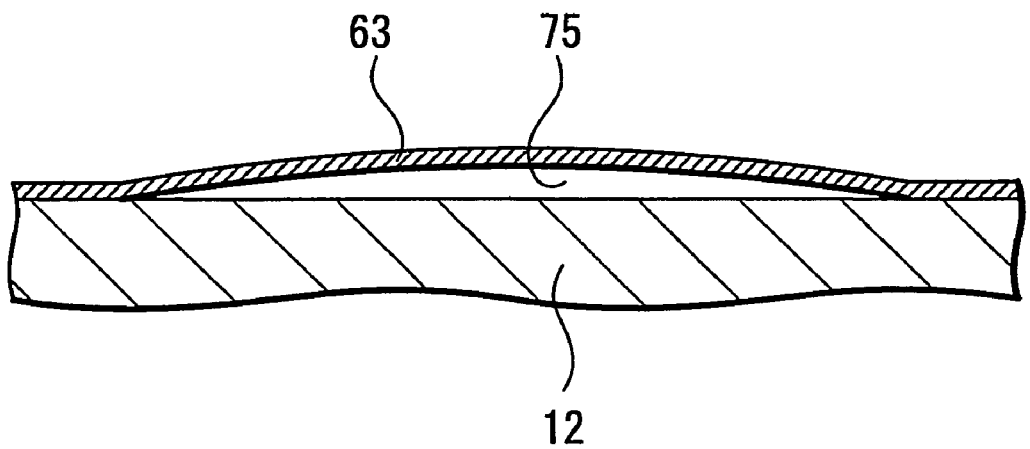
FIG. 17 is an explanatory diagram illustrating a space created between the disk tray and the disk cover.

FIG. 9 is an explanatory view illustrating main parts of a disk tray and a disk cover of the disk drive device; FIG. 10 is a cross sectional view of the disk drive device; FIGS. 11A and 11B are explanatory views illustrating enlarged main portions of FIG. 10; FIG. 12 is an explanatory view of a contact portion between the disk tray and the disk cover; FIG. 13 is an explanatory view illustrating an example of an elastic member mounted to the disk cover; FIG. 14 is an explanatory view illustrating another example of the elastic member; FIG. 15 is an explanatory view illustrating a state before the disk tray is installed into a tray housing case of the disk drive device; FIGS. 16A and 16B are explanatory views illustrating states of installing the disk tray into the tray housing case; and FIG. 17 is an explanatory view illustrating a space created between the disk tray and the disk cover.

First, with reference to FIG. 2, a laptop type personal computer (hereinafter referred to as "laptop computer") as the example of the disk recording and/or reproducing device according to the embodiment of the invention will be described. A laptop computer 1 includes a housing 2 having a flat rectangular parallelpiped shape and a cover 3 also having a flat rectangular parallelpiped shape. The housing 2 and the cover 3 are provided with space portions having predetermined sizes, respectively, and are configured so as to be stackable while being laid on each other. In other words, the cover 3 is stacked upon the housing 2, and the housing 2 and the cover 3 are rotatably coupled to each other through a hinge mechanism 4.

The hinge mechanism 4 includes a pair of housing side hinge portions 4a, 4a provided so as to extend in a left and right direction at both upper rear side portions of the housing 2; a cover side hinge portion 4b which extends in a left and right direction at a rear center portion of the cover 3 and which is sandwiched between the pair of housing side hinge portions 4a, 4a; and a hinge shaft 4c which passes through the pair of housing side hinge portions 4a, 4a and the cover side hinge portion 4b opposed to each other on the same axis line. The hinge mechanism 4 couples the housing 2 with the cover 3 in a rotatable manner, thereby forming the laptop computer 1 in which the cover 3 is rotatable in an up and down direction with regard to the housing 2. Note that the cover 3 is capable of holding its posture relative to the housing 2 at an arbitrary angular position.

As shown in FIG. 2, an opening portion 5 is provided in a surface of the cover 3, facing an upper surface of the housing 2, which is an interior surface of the cover 3, with a slight rim left around the opening portion 5. A flat display panel 6 as a display device housed in the cover 3, such as a liquid crystal display, an organic EL display, a surface-conduction electron-emitter display, etc., is exposed through the opening portion 5 of the cover 3. Inside of the flat display panel 6 provided as necessary are, but not shown, a backlight for lighting a rear surface side of the flat display panel 6, a circuit board on which a control device for controlling a screen of the flat display panel 6 has been mounted, and the like. And, various information, images, and the like can be displayed on the flat display panel 6.

A surface facing the opening portion 5 of the cover 3, which is the top surface of the housing 2, is provided with a key-type input portion 7 having many keys and a touch-type input portion 8 for performing an input operation, provided with a touch panel-type input device or the like. Control signals are input through the input portions 7, 8 to perform predetermined information processing or the like. The housing 2 houses therein a below-described disk drive device 10, a not shown control board mounting thereon a control device for controlling the disk drive device 10 and other devices, apparatus, or the like, and a not shown battery source for supplying electric power to the disk drive device 10, the control device, and the like.

The laptop computer 1 includes a drive housing portion 9 provided on a side surface of the housing 2, in which the disk drive device 10 is housed. The disk drive device 10 rotationally drives a disk-like recording medium and performs recording (writing) and reproducing (reading) of an information signal to and from an information recording portion of the disk-like recording medium. The disk drive device 10 has a configuration as illustrated in FIGS. 3 to 6. Namely, the disk drive device 10 includes, as shown in FIG. 5 and others, a disk tray 12 having a disk housing portion 11 which houses an optical disk D as one example of the disk-like recording medium in a manner that the optical disk D can be put in and taken out; a tray housing case 13 for supporting the disk tray 12 in an insertable/ejectable manner; a disk cover 14 for covering the disk housing portion 11 of the disk tray 12 housed in the tray housing case 13; a drive unit 20 assembled with the disk tray 12, and the like.

The drive housing portion 9 in which the disk drive device 10 is housed has an opening portion at one side surface of the housing 2, and the disk drive device 10 is installed into the drive housing portion 9 so as to close the opening portion of the housing 2, and thereby the disk drive device 10 is installed to the housing 2. Examples of the disk-like recording medium to be used in the disk drive device 10 include various recording disks such as a magneto-optical disk, a magnetic disk, etc., in addition to the optical disk D described in the present exemplary embodiment.

Also, various optical disks can be applicable, such as a CD-RW, a DVD-R, a DVD-RW, etc., which are writable or rewritable media capable of recording one time or multiple times, not to mention optical disks such as a CD, a CD-ROM, a DVD-ROM, etc., which are play-back only media. Corresponding to these optical disks, examples of the disk recording and/or reproducing device include an optical disk recording device, an optical disk reproducing device, an optical disk recording and/or reproducing device, an optical disk imaging device, a magneto-optical disk recording device, a magneto-optical disk reproducing device, a magneto-optical disk imaging device, a magnetic disk recording device, a magnetic disk reproducing device, a magnetic disk recording and/or reproducing device, etc.

Regarding the size of the optical disk or the like to be used in the disk drive device 10, a case of using a disk-like recording medium having a diameter of 12 cm is described in this embodiment. However, it is not limited to this, and it is needless to say that an optical disk of any size may be employed in the disk drive device 10, not to mention a disk-like recording medium having a diameter of 8 cm. Further, the disk drive device 10 may be configured such that as the disk-like recording medium, any of a plurality of kinds of disks having different diameters, e.g., an optical disk of 12 cm diameter and an optical disk of 8 cm diameter, can be used.

The disk tray 12 of the disk drive device 10 is made of an approximately flat plate-like member and is provided with the disk housing portion 11 on the top surface serving as the main surface. The disk housing portion 11 is formed of a circular concave portion, and an inner circumference surface of the disk housing portion 11 is formed as a side surface wall 16. A portion from one corner of a rear side of the disk tray 12 to the side surface portion is formed in an arc shape in order to expose the side surface wall 16. Accordingly, a corner portion in which a tip end thereof has been sharpened 90 degrees is formed in three places of the outside of the disk housing portion 11 of the disk tray 12. A front plate 18 is provided integrally with a base end portion of the disk tray 12, which is one side in a tray moving direction X of the disk tray 12.

The front plate 18 closes the opening portion of the disk drive housing portion 9 provided in the housing 2 and thus has a size and a shape corresponding to those of the opening portion of the disk drive housing portion 9. In other words, the front plate 18 is made of a long plate-like member capable of closing the opening portion of the disk drive housing portion 9, and is fixed on a front surface at the ejection side of the disk tray 12 with a flat surface of the front plate 18 directed in a direction orthogonal to the main surface of the disk tray 12. The front plate 18 is provided with an eject button 19 for causing the disk tray 12 to be automatically ejected from the tray housing case 13.

The eject button 19 is an operation (activation) device of a not-shown tray ejecting mechanism. The tray ejecting mechanism can be configured using, for example, an electromagnetic solenoid with an electromagnet. The electromagnetic solenoid includes, for example, a moving core fixed to the disk tray 12, a fixing core fixed to the tray housing case 13, a coil mounted on the fixing core, a return spring of the moving core, and the like. Then, the moving core is stuck to the fixing core due to a magnetic effect of current flowing through the coil to thereby hold the disk tray 12 in a first position where the disk tray 12 is housed in the tray housing case 13, and the moving core is detached from the fixing core due to a force of the return spring by turning off the current to shift the disk tray 12 to a second position where the disk tray 12 comes out of the tray housing case 13. The eject button 19 can be used as a switching member for turning off the current of the electromagnetic solenoid.

The disk housing portion 11 of the disk tray 12 is provided with an opening hole 21 with which a drive unit 20 is engaged. The opening hole 21 has a size and a shape consistent with a planner shape of the drive unit 20, and the drive unit 20 fixed on a not-shown base member is engaged with the opening hole 21. The base member is screwed onto an undersurface of the disk tray 12, and a top surface of the drive unit 20 placed on the base member is set at a height approximately the same as a height of a disk placing surface of the disk housing portion 11.

Both corner portions of the disk tray 12 are provided with a pair of concave portions 17, 17 as shown in FIGS. 5 and 9. The pair of concave portions 17, 17 is provided in order to control an orientation (inclination) of a disk cover 14, and is formed in a concave shape having an almost V-shape in cross section in the tray moving direction X. Further, one of the front corner portions of the disk tray 12 is provided with a concave hook portion 22 connected with the disk housing portion 11. The concave hook portion 22 is provided for allowing a tip of a finger to hook an outer periphery of the optical disk D placed on the drive unit 20 in order to pull up the optical disk D. Only at a portion corresponding to the concave hook portion 22, the side surface wall 16 of the disk housing portion 11 is cutout. That is, a cutout for exposing an outer periphery of the optical disk D placed in the disk housing portion 11 is provided at a portion of the side surface wall 16. As the material for the disk tray 12 and the front plate 18, for example, engineering plastic such as ABS (acyrilonitrile-butadiene-styrene resin) is suitable. However, a metal such as an aluminum alloy may also be employable.

The drive unit 20 installed in the disk tray 12 is configured as illustrated in FIGS. 7 and 8. That is, the drive unit 20 includes a base frame member 24 elastically supported by the not shown base member through a mount insulator, a disk rotation driving device 25 fixed to the base frame member 24, an optical pickup 26 supported by the base frame member 24 in a movable manner, a pickup moving mechanism 27 which allows the optical pickup 26 to move in a back and force direction, and the like.

The disk rotation driving device 25 of the drive unit 20 has a turn table 28 serving as a disk placement unit, on which the optical disk D is placed. The turn table 28 of the disk rotation driving device 25 is rotationally driven to thereby rotate the optical disk D at a predetermined speed (for example, at a constant linear velocity). The optical pickup 26 writes new information by irradiating a light beam onto an information recording surface of the optical disk D placed on the turn table 28 to be rotationally driven, or alternatively, reads information preliminarily recorded on the information recording surface by reading reflection light of an irradiated light beam.

The pickup moving mechanism 27 causes the optical pickup 26 to move, along the information recording surface of the optical disk D placed on the turn table 28 to be rotationally driven, in a radial direction of the optical disk D. The information signal recording and/or reproduction operations are performed when the optical pickup 26 is moved outwardly in the radial direction of the optical disk D. The disk rotation driving device 25, the optical pickup 26, and the pickup moving mechanism 27 are mounted to the base frame member 24. The drive unit 20 including the base frame member 24 is mounted to the disk tray 12 through the not shown base member.

As shown in FIG. 8, the base frame member 24 is formed by punching a sheet metal in a predetermined shape and by bending the periphery of the thus punched sheet metal downward slightly. The base frame member 24 is provided, in its planner shape, with large chamfer portions at four corners of a rectangular shape and a large opening portion 31 inside thereof, and is formed as a horizontally long roughly octagon frame on the whole. The opening portion 31 of the base frame member 24 includes a pickup opening portion 31*a* for exposing a top portion of the optical pickup 26 and a table opening portion 31*b* for allowing the turn table 28 of the disk rotation driving device 25 to face upwardly. The pickup opening portion 31*a* is formed in a large roughly rectangular shape so as to expose the entire top portion of the optical pickup 26, and the roughly semicircle table opening portion 31*b* is arranged on one side in the longitudinal direction of the pickup opening portion 31*a*.

The disk rotation driving device 25 is arranged in the table opening portion 31*b* of the opening portion 31. The disk rotation driving device 25 includes a spindle motor 29 with the turn table 28 on which the optical disk D is detachably placed, and a supporting plate 32 for fixing the spindle motor 29 so as to be supported by the base frame member 24. The turn table 28 is integrally mounted on a rotation unit of the spindle motor 29 and is rotatably supported by a fixing portion fixed to the supporting plate 32. The supporting plate 32 for supporting the spindle motor 29 is mounted onto the undersurface of the base frame member 24 by being screwed thereto so as to allow a placement portion 28*b* of the turn table 28 to slightly project upwardly from the table opening portion 31*b* of the base frame member 24.

The turn table 28 includes an engagement portion 28*a* having a column-shaped convex portion to be engaged with a central hole d of the optical disk D, and the placement portion 28*b* on which a circumference portion of the central hole d of the optical disk D is placed. The engagement portion 28*a* and the placement portion 28*b* are formed in one piece, and the placement portion 28*b* is provided with a ring-like cushion member 33 serving as a buffer for mitigating contact with the optical disk D. The engagement portion 28*a* is provided with a plurality of locking claws 34 (three in the present embodiment) which are to be engaged with the central hole d of the optical disk D, substantially equally spaced apart from each other in the circumferential direction of the optical disk D. Each of the locking claws 34 is biased by a not shown elastic member such as a coil spring, and a top end portion of the each locking claw projects radially outward from the outer peripheral surface of the engagement portion 28*a*. These locking claws 34 provide a chucking mechanism, and the optical disk D is held by the turn table 28 when all the locking claws 34 engage with the central hole d.

The optical pickup 26 can move toward and away from the disk rotation driving device 25 within a predetermined range. The optical pickup 26 includes a semiconductor laser which serves as a light source emitting a light beam, and a light detector including a light receiving element or the like for receiving a returned light beam. The optical pickup 26 emits the light beam from the semiconductor laser, condenses the light beam with a pickup lens 36, and irradiates the light beam onto the information recording surface of the optical disk D, and at the same time receives a returned light beam reflected by the information recording surface of the optical disk D with the light detector. Thereby, writing and reading of an information signal with respect to the information recording surface of the optical disk D can be achieved.

Also, the optical pickup 26 has a lens driving mechanism such as a biaxial actuator, which drives the pickup lens 36 to shift in a light axis direction (hereinafter referred to as the "focusing direction") and in a direction orthogonal to a recording track of the optical disk D (hereinafter referred to as the "tracking direction"). The lens driving mechanism causes the pickup lens 36 to focus on the information recording surface of the optical disk D while shifting the pickup lens 36 in the focusing direction and in the tracking direction based on a detection signal from the optical disk D detected by the light detector. Thereby, drive control of a focusing servo for adjusting a focus of the pickup lens 36 on the information recording surface and a tracking servo for causing a spot of the light beam condensed by the pickup lens 36 to track the recording track is performed. The optical pickup 26 is mounted on the base frame member 24 through the pickup moving mechanism 27 and is configured to move toward and away from the turn table 28 within the predetermined range.

The pickup moving mechanism 27 includes a pickup base 37, a pair of guide shafts 38, 39, a feed screw shaft 41, and a driving motor 42. The pickup base 37 is formed of a flat block-shaped member in which the biaxial actuator, the light detector, and the like are housed, and is supported by the pair of guide shafts 38, 39 in a movable manner. The pair of guide shafts 38, 39 is arranged on the undersurface of the base frame member 24 at one side of the turn table 28 so as to be spaced apart from each other by a predetermined distance and substantially in parallel with each other. The pair of guide shafts 38, 39 is supported at both ends thereof by bearing parts at four places of the base frame member 24. Each bearing part includes a bearing piece provided on the base frame member 24 and a holding member for holding the bearing piece, and the holding member is screwed to hold the guide shafts 38, 39 between the holding member and the bearing piece, thereby allowing both ends of each of the guide shafts 38, 29 to be fastened onto the base frame member 24.

The pickup base 37 includes a first bearing part 43 and a second bearing part 44 which project outwardly in the direction orthogonal to the shaft direction of the pair of guide shafts 38, 39. The first bearing part 43 includes a front side bearing part 43a and a rear side bearing part 43b respectively provided with bearing holes into which the first guide shaft 38 is slidably inserted. The front side and the rear side bearing parts 43a, 43b are arranged on the same plane spaced apart from each other by a predetermined distance in a shaft direction of the first guide shaft 38. Between the front side and the rear side bearing parts 43a, 43b is arranged a rack member 45 including an engaging portion which engages with a groove of the feed screw shaft 41. The rack member 45 is screwed onto the pickup base 37 with a fixation screw 46.

The second bearing part 44 is provided with a guide groove open in a lateral direction. The second guide shaft 39 is inserted into this guide groove in a slidable manner. The second guide shaft 39 which passes through the second bearing part 44 and the first guide shaft 38 which passes through the front side and the rear side bearing parts 43a, 43b of the first bearing 43 support the pickup base 37 in a slidable manner. The feed screw shaft 41 is arranged roughly in parallel with the first guide shaft 38 with a predetermined distance spaced therebetween. The feed screw shaft 41 serves as a rotation shaft of a drive motor 42 fixed to the base frame member 24 through a not-shown mounting bracket. Also, the mounting bracket supports a top end side of the feed screw shaft 41 in a rotation free manner. The mounting bracket is screwed onto the base frame member 24, and thus the feed screw shaft 41 and the drive motor 42 are mounted to the base frame member 24.

The pickup base 37 is coupled with one end of a not-shown flexible wiring board. The flexible wiring board has flexibility and excellent softness and serves to electrically connect between the optical pickup 26 held by the base frame member 24 and a not-shown power source side connector provided outside the drive unit 20. The flexible wiring board includes a first joint to be mounted to the pickup base 37 and a second joint to be connected to the power source side connector. The flexible wiring board is provided with a wiring circuit group including a number of wiring circuits formed thereon, and each of the wiring circuits is connected from the first joint to the second joint.

As shown in FIG. 7, a base cover 47 is mounted on a top surface of the base frame member 24. The base cover 47 has a shape roughly corresponding to the planner shape of the base frame member 24. The base cover 47 is provided with an opening portion 48 for exposing the turn table 28 and the pickup lens 36 of the optical pickup 26. The opening portion 48 extends in a movement direction of the optical pickup 26 and is formed as an elongated hole continuing to the table opening portion 31b exposing the turn table 28 from a position where the optical pickup 26 is furthest from the turn table 28. The base cover 47 is fastened onto a top surface of the base frame member 24 through a plurality of fixation screws 49 (6 fixation screws in the present embodiment).

The drive unit 20 having the above-described configuration is fixed to the base member at three places through dampers, respectively. Therefore, the base frame member 24 is provided with three leg pieces 24a, and the dampers are mounted to neck portions of the leg pieces 24a, respectively. By means of fixation of the drive unit 20 to the base member through the dampers, a structure that disturbance such as vibration and an impact is hard to be conveyed to the optical pickup 26 can be realized.

The tray housing case 13 through which the disk tray 12 is inserted or ejected includes, as shown in FIG. 6, a tray chassis 51 in which the top surface and the front surface are open, and a top cover 52 in which the undersurface and the front surface are open. The top cover 52 is laid on the tray chassis 51, and thereby a tray housing unit 60 is formed in which only the front surface is open. In such a state, the top cover 52 is fastened onto the tray chassis 51 through fixation screws 53 as shown in FIGS. 3 and 4, and thereby the tray housing case 13 is formed. The disk tray 12 is inserted into or ejected from the opening portion of the tray housing unit 60 opened at the front surface of the tray housing case 13.

As shown in FIG. 6, a step 51b having a suitable height is provided at one side of an undersurface portion 51a of the tray chassis 51 in a direction Y orthogonal to the tray moving direction X the disk tray 12 is inserted and ejected, and a top end of the step 51b is provided with a continuous shelf portion 51c projecting outwardly. The shelf portion 51c is provided in order to house an extending portion 12a of the disk housing portion 11 of the disk tray 12 extended in an arc shape (cross-hatched portion of FIG. 6) as a result of forming the disk housing portion 11 of the disk tray 12 in a complete circle.

The undersurface portion 51a of the tray chassis 51 houses a control board 54 mounting on a predetermined circuit board a microcomputer, electronic devices, and other devices and parts that are necessary. The one side of a not-shown flexible wiring board is electrically connected to the control board 54, and the other side of the flexible wiring board is mechanically and electrically connected to the connector of the drive unit 20. Further, the control board 54 is provided with a connector 55 for establishing an electrical connection with an exterior electronic device. To the undersurface portion 51a of the tray chassis 51 is fixed a pair of fixed rails 56L, 56R. The first fixed rail 56L supports a first movable rail 57L so as to be movable in its longitudinal direction. And, the second fixed rail 56R supports a second movable rail 57R so as to be movable in its longitudinal direction.

As shown in FIGS. 5 and 10, the pair of fixed rails 56L, 56R is arranged so that the longitudinal direction thereof is oriented towards the tray moving direction X at each corner in the direction Y orthogonal to the undersurface portion 51a of the tray chassis 51. The first fixed rail 56L of the pair of fixed rails 56L, 56R is U-shaped in its cross section. As shown in FIG. 11B and other drawings, the first fixed rail 56L has a height roughly the same as that of the step portion 51b of the tray chassis 51. The first fixed rail 56L is fixed onto the undersurface portion 51a with an opening side of the first fixed rail 56L oriented inwardly so as to be opposed to the second fixed rail 56R.

The second fixed rail 56R has a portion U-shaped in its cross section, an interior flange portion 56a bent inwardly at one end, and an exterior flange portion 56b bent outwardly at another end. As shown in FIG. 11A and other drawings, the exterior flange portion 56b of the second fixed rail 56R has a height slightly lower than the height of the tray chassis 51 so as to come inside the height of the tray chassis 51. The second fixed rail 56R is fixed onto the undersurface portion 51a with the opening side thereof oriented inwardly so as to be opposed to the first fixed rail 56L.

The first movable rail 57L is movably inserted into the concave (U-shaped) portion of the first fixed rail 56L. The second movable rail 57R is movably inserted into the concave (U-shaped) portion of the second fixed rail 56R. The first movable rail 57L and the second movable rail 57R each has an interior flange portion 57a at one end of the concave (U-shaped) portion. The first leg portion 58L provided on the under surface of the disk tray 12 is engaged in the concave (U-shaped) portion of the first movable rail 57L in a slidable manner. The second leg portion 58R provided on the undersurface of the disk tray 12 is engaged in the concave (U-shaped) portion of the second movable rail 57R in a slidable manner.

The first leg portion 58L and the second leg portion 58R are supported so as to be movable in their respective longitudinal directions in the respective concave portions of the first movable rail 57L and the second movable rail 57R. A state that the two movable rails 57L, 57R are completely housed in the two fixing rails 56L, 56R in the tray housing unit 60 is the tray housing state that the disk tray 12 is positioned in the tray housing unit 60 of the tray housing case 13. In this state, chucking and releasing operations of the optical disk D with regard to the drive unit 20 can be performed, and recording and reproduction of the information signal with regard to the optical disk D is executable by the drive unit 20.

On the other hand, a state that the two movable rails 57L, 57R have mostly moved out of the two fixed rails 56L, 56R is a state that the disk tray 12 has moved out of the tray housing case 13 to a disk eject position. At the disk eject position, the optical disk D can be taken out from the disk housing portion 11 of the disk tray 12, and also the optical disk D can be put in the disk housing portion 11.

The disk cover 14 is arranged laid on the tray chassis 51. The disk cover 14 is arranged so as to close the opening portion of the top surface of the tray chassis 51 and is supported by a pair of shafts 61, 61 so as to swing in an up and down direction. The pair of shafts 61, 61 is provided to project laterally at a rear portion of the tray chassis 51, and the disk cover 14 is configured to swing in an up and down direction within a predetermined angular range around the pair of shafts 61, 61.

The disk cover 14 has a shape and a size to cover the entire top surface of the tray chasses 51 and is formed of a thin sheet metal-made plate member having suitable elasticity. Examples of the suitable material of the disk cover 14 include stainless steel having a spring property, spring steel, or the like. The plate thickness of the disk cover 14 is preferably equal to or less than 0.5 mm when thinning and down-sizing of the entire device is taken into consideration. If the spring property, the strength, etc. are taken into consideration, the most preferable plate thickness of the disk cover 14 is between 0.2 mm and 0.4 mm. The suitability of plate thickness of the disk cover 14 will be described later more in detail.

The disk cover 14 is provided with a roughly circular central bulging portion 14a having a size corresponding to that of the disk housing portion 11 of the disk tray 12. An escape bulging portion 14e bulging upwardly and having a small diameter is provided at a center of the central bulging portion 14a. The escape bulging portion 14e is provided in order to avoid the disk cover 14 from contacting the engagement portion 28a of the turn table 28. The optical disk D is housed inside the central bulging portion 14a. An annular contact portion 63 continuous in its circumferential direction is provided to the periphery of the central bulging portion 14a. The annular contact portion 63 contacts the top surface of the disk tray 12 to close the disk housing portion 11 with the disk cover 14, thereby preventing dust or the like from invading into the disk housing portion 11.

Three corners arranged so as to project in three directions from the central bulging portion 14a are provided outside the annular contact portion 63 of the disk cover 14. The three corners include a first front corner 14b and a second front corner 14c arranged at both sides of the front side of the disk cover 14 in the tray moving direction X, and a rear corner 14d arranged on one side of the rear side of the disk cover 14 in the tray moving direction X. Accordingly, the rear corner 14d and the second front corner 14c are opposed to each other in a diagonal line direction with the central bulging portion 14a placed therebetween. A chamfer-like cutout is arranged in a diagonal line direction of the first front corner 14b to be opposed thereto.

The three corners 14b, 14c, 14d of the disk cover 14 are provided with elevating elastic pieces 64A, 64B, 64C as plate springs, respectively. Each of the three elevating elastic pieces 64A, 64B, 64C is formed by providing a slit extending in the tray moving direction X at a position away from a side edge of the disk cover 14 by a predetermined width to form an elongate piece and by bending the elongate piece into a reverse-V shape to provide elasticity to the elongate piece. The bent sides of bended portions of the three elevating elastic pieces 64A, 64B, 64C are formed so as to project from a surface of the annular contact portion 63. With the elastic deformation of the elevating elastic pieces 64A, 64B, 64C, the annular contact portion 63 is pressed to contact the periphery of the disk housing portion 11 of the disk tray 12 as described below, and thereby the disk housing portion 11 is covered by the disk cover 14 and dust or the like is prevented or suppressed from invading into the disk housing portion 11.

Further, the three corners 14b, 14c, 14d of the disk cover 14 are provided with plate springs 65A, 65B, 65C exemplified as examples of an elastic member, respectively. The plate springs 65A, 65B, 65C are provided in order to press the annular contact portion 63 to contact the periphery of the disk housing portion 11 of the disk cover 14, and each has a configuration as shown in FIGS. 5 and 13, and others. Each of the plate springs 65A, 65B, 65C includes a belt-like fixing piece 66a fixed to the disk cover 14 and standing pieces 66b, 66b which are formed continuously at both sides in a width direction of the fixing piece 66a and have elasticity. Also, the fixing piece 66a is integrally fixed onto the disk cover 14 by being caulked.

In other words, each of the plate springs 65A, 65B, 65C includes the fixing piece 66a bent into a reverse V-shape in a middle of the longitudinal direction thereof, and four pieces of the elastic standing pieces 66b which project bilaterally in a width direction at both sides of the bent portion of the fixing piece 66a. Each of the four standing pieces 66b is raised at a suitable angle, and thereby elasticity is provided to each of the standing pieces 66b. A caulking hole 66c is provided at a plurality of places (two places in the present embodiment) of the fixed piece 66a. Burring shaft portions 67 provided on the disk cover 14 are engaged with respective caulking holes 66c (see FIG. 13). By caulking top ends of the burring shaft portions 67, the plate springs 65A, 65B, 65C are fixed to the three corners 14b, 14c, 14d of the disk cover 14, respectively.

Bearing pieces 68 projecting in the direction opposite to the direction the central bulging portion 14a bulges are provided at both sides in the direction Y of the disk cover 14 in the vicinity of the third corner 14d and the portion without a corner (only the right side bearing is illustrated here), respectively. Each of the bearing pieces 68 is provided with a bearing hole, and a corresponding one of the pair of shafts 61 provided on the tray chassis 51 is engaged with the bearing hole in a freely rotatable manner. Thereby, the disk cover 14 is supported with regard to the tray chassis 51 so as to swing in the up and down direction around the pair of shafts 61.

The top cover 52 that covers over the disk cover 14 has a shape and a size corresponding to a planner shape of the tray chassis 51. And, as shown in FIGS. 4 and 10, the top cover 52 can be laid on the tray chassis 51. The top cover 52 includes a top surface portion 52a which covers the top surface of the tray chassis 51, right and left side surface portions 52b, 52c which cover portions of side surfaces of the tray chassis 51, and a back surface portion 52d which covers a portion of a back surface of the tray chassis 51. The top surface portion 52a is provided with insertion holes 69 (at four places in the present embodiment) for screwing the top cover 52 onto the chassis 51. Screw holes are provided at places (four places) of the tray chassis 51, corresponding to the insertion holes 69. Fixation screws 53 are screwed into the insertion holes 69 and the screw holes of the tray chassis 51, thereby fastening the top cover 52 and the tray chassis 51 together to assemble the disk drive device 10 as shown in FIG. 3.

The disk drive device 10 having the above-described configuration can be assembled, for example, in the following manner with ease. First, the drive unit 20, the front plate 18, the eject mechanism, and the right and the left movable rails 57L, 57R are incorporated onto the disk tray 12. On the other hand, as shown in FIG. 6, the left and the right fixed rails 56L, 56R are incorporated onto the tray chassis 51. At this time, the control board 54 is preliminarily incorporated into the tray chassis 51. The above-described assembling state is illustrated in FIG. 5.

Next, the pair of movable rails 57L, 57R is assembled with the pair of fixed rails 56L, 56R, and the disk tray 12 is movably supported by the tray housing case 13. Then, the disk cover 14 is assembled with the tray chassis 51. Finally, as shown in FIG. 4, the top cover 52 is laid from above on the disk cover 14. Then, the top cover 52 is screwed onto the tray chassis 51 through the plurality of fixation screws 53. Thus, the assembly operation of the disk drive device 10 in which the thickness of the entire device has been made remarkably thin as shown in FIG. 3 is completed.

The disk drive device 10 thus assembled is mounted to the drive housing portion 9 of the housing 2 as shown in FIG. 2. Thereby, the laptop computer 1 with the disk drive device 10 is manufactured. The disk drive device 10 assembled into the laptop computer 1 can be used, for example, in the following manner.

When using the disk drive device 10, first a user presses the eject button 9 to have the disk tray 12 ejected a predetermined distance. When the disk tray 12 has been ejected the predetermined distance, almost all the disk housing portion 11 is exposed. Then, the optical disk D is placed on the turn table 28 arranged at the center portion of the disk housing portion 11. Since the turn table 28 is a self-chucking type, the optical disk D is securely chucked by the turn table 28 by merely being placed on the turn table 28. When the user takes out the optical disk D from the turn table 28, since there is the concave hook portion 22 at a portion of the side surface wall 16, by inserting a finger tip into the concave hook portion 22 and hooking the finger tip to the outer periphery of the optical disk D, the placed optical disk D can be taken out with ease.

Then, the user slightly depresses the disk tray 12 to have the not-shown tray moving mechanism operated. Thereby, the disk tray 12 is pulled into the tray housing case 13 through an operation of the tray moving mechanism. Then, the disk tray 12 is positioned in a predetermined position of the tray housing unit 60 of the tray housing case 13.

At this time, as shown in FIG. 15, in the state that before the disk tray 12 is inserted into the tray housing unit 60, the disk cover 14 is held in a position roughly horizontal to the tray housing case 13. Accordingly, portions (central bent portions) of the left and right elevating elastic pieces 64A, 64B provided at both of the left side and the right side in the tray moving direction X of the front side of the disk cover 14 protrude a movement locus of a top end portion 71 of the disk tray 12.

Further, when the disk tray 12 comes into the tray housing unit 60, the top end portion 71 of the disk tray 12 contacts the central bent portions of the left and the right elevating elastic pieces 64A, 64B and have those elastic pieces elastically deformed to be raised upwardly. Thereby, as shown in FIG. 16A, the disk cover 14 is rotated around the pair of shafts 61 in a counterclockwise direction in FIG. 16A and the insertion side of the disk cover 14 is raised a little bit. Accordingly, a pull-in portion 72 of the disk cover 14 formed between the left and the right elevating elastic pieces 64A, 64B is raised higher than the top surface of the disk tray 12. As a result thereof, the pull-in portion 72 of the disk cover 14 never rubs the top surface of the disk tray 12, and thereby smooth movement of the disk tray 12 can be achieved.

When the disk tray 12 further comes into the tray housing unit 60 and moves near to a predetermined position, the left and the right elevating elastic pieces 64A, 64B provided on the disk cover 14 come inside the left and the right concave portions 17, 17 provided on the disk tray 12. Then, when the disk tray 12 moves to the predetermined position, the left and the right elevating elastic pieces 64A, 64B come into predetermined depths of the left and the right declined portions 17, 17. Thereby, as shown in FIG. 16B, the annular contact portion 63 of the disk cover 14 is strongly depressed against the circumference of the disk housing portion 11 of the disk tray 12 at a contact portion 73 (contact portion indicated by a bold broken line in FIG. 9) of the front side in the tray moving direction X. The pressuring force of the disk cover 14 is applied by the three plate springs 65A, 65B, 65C.

Then, recording or reproduction of an information signal is started with regard to the optical disk D. Namely, the optical disk D is rotated with driving the spindle motor 29 and the optical pickup 26 is operated to execute writing or reading of the information signal with regard to the information recording surface of the optical disk D. At this time, if the optical disk D is driven to rotate at a predetermined speed, wind noise or other noise would be caused by the optical disk D, however, most of such noises can be reduced with provision of the disk cover 14.

In order to produce a low-noise effect with the disk cover 14, it is preferable that the disk cover 14 is so configured that the current flow caused by rotation of the optical disk D is prevented from hitting the top cover 52. This is because, if the current flow hits the top cover 52, noise may be caused by the current flow. Therefore, in the present embodiment, the extending portion 12a is provided in the disk tray 12 such that the entire periphery of the disk housing portion 11 is enclosed by the side surface wall 16. Thereby, the current flow is prevented from flowing from the disk housing portion 11 to the top cover 52 side to thereby effectively suppress occurrence of noise.

When arranging the disk cover 14 between the optical disk D and the top cover 52, it is preferable to obtain a space 1 mm or more over and below the upper and underneath surfaces of the optical disk D, considering a surface fluctuation of the optical disk D. Therefore, in the disk drive device 10 for which thinning has progressed recently, the space for arranging the disk cover 14 becomes about 0.5 mm. However, it is difficult to obtain a molded product having a thickness equal to or less than 0.5 mm and, even if it is obtainable, such a thinner product may have considerably less strength. Therefore, at this time, it is preferable to produce the disk cover 14 with sheet metal.

Figure 1:
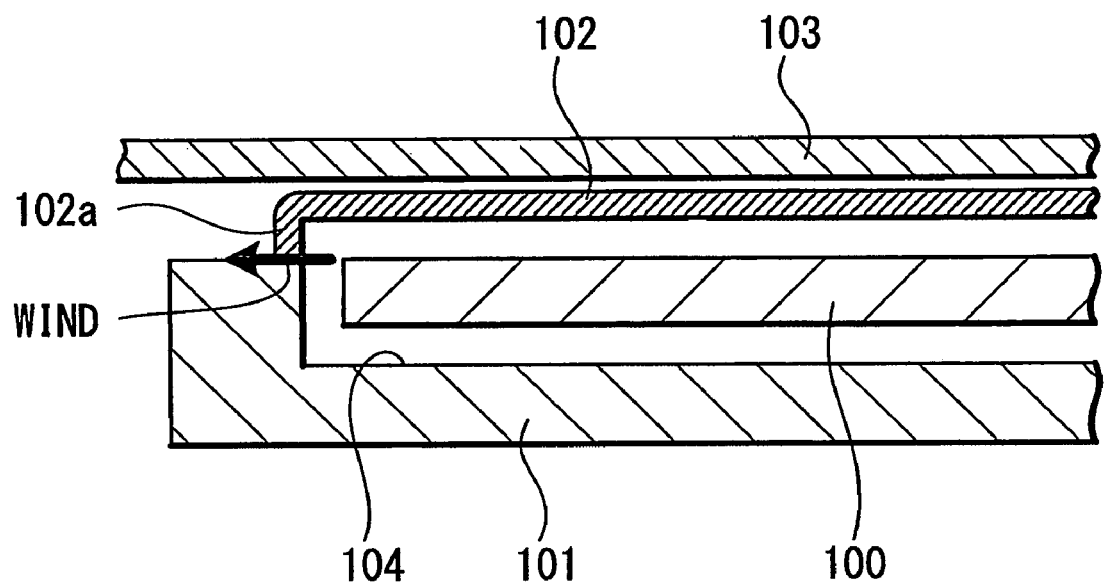
FIG. 1 is an explanatory diagram illustrating a contact portion between a disk tray and a disk cover in related art.

When the disk cover 14 is made of sheet metal, a configuration of the contact portion of the disk cover 14 with the disk tray 12 is typically considered. That is, as described as the related art in FIG. 1, when the disk cover 14 made of sheet metal is brought into contact with the disk tray 12 at a cut surface (edge surface) of the sheet metal, a large amount of wind caused by rotation of the optical disk D will go outside, since the thickness of the sheet metal is equal to or less than 0.5 mm and the contact area of the cut surface of the sheet metal with the disk tray 12 is relatively small. Therefore, noise occurs when wind goes through the contact surface of the disk cover 14 and the disk tray 12, resulting in failing to produce a preferable low-noise effect. In contrast, in the invention, the annular contact portion 63 of the disk cover 14 which contacts the disk tray 12 is formed to have a large bent surface which is wider than the cut surface of the sheet metal, that is, the dimension of the width of the annular contact portion 63 in a radial direction of the disk housing portion 11 is larger than the dimension of the thickness of the disk cover 14, so that the contact area thereof with the disk tray 12 is increased, and thereby a structure that it is difficult for wind to go through the contact area is realized. Accordingly, it becomes possible to reduce going through of wind caused by rotation of the optical disk D and to thereby achieve a reduction of the noise level effectively.

The disk cover 14 may be warped as shown in FIG. 17 since the thickness of the disk cover 14 is extremely thin such as equal to or less than 0.5 mm. In this case, if the disk cover 14 is warped, a space 75 is created between the annular contact portion 63 of the disk cover 14 and the contact portion of the disk tray 12, resulting in wind noise caused by rotation of the optical disk D going through the space 75, or the wind itself going through the space 75 to cause noise.

To the contrary, in the invention, the disk cover 14 is provided with the plate springs 65A, 65B, 65C and is biased (precompressed) onto the disk tray 12 owing to the spring force of the plate springs. By screwing the top cover 52 onto the tray chassis 51 through the fixation screws 53, the three plate springs 65A, 65B, 65C are sandwiched from both sides thereof and precompression can be applied to the disk cover 14. As a result thereof, the disk tray 12 can be brought into close contact with the entire periphery of the annular contact portion 63 of the disk cover 14 owing to the spring force of the three plate springs 65A, 65B, 65C.

The three plate springs 65A, 65B, 65C are provided on the disk cover 14. This is because, when caulking the plate springs, if the plate springs are caulked on the side of the top cover 52, holes are created in the top cover 52, through which wind passes to cause noise. To the contrary, if the plate springs are caulked onto the disk cover 14, in assembly, the disk cover 14 is brought into close contact with the disk tray 12, so that the caulking holes are closed by the disk tray 12, and therefore there is less possibility of causing noise.

FIG. 14 illustrates an exemplary embodiment in which a plate spring 77 is cut from the disk cover 14 and is formed as an integral portion of the disk cover 14. With provision of the plate spring 77, a space such as a slit or a hole is formed in the disk cover 14, however, since the disk cover 14 is brought into close contact with the disk tray 12 in assembly, the space is closed with the disk tray 12 and thereby noise can be prevented from occurring. The number of plate springs is not limited to three as described above, and can be four or more, or may be two or only one.

As described above, according to the embodiment of the invention, a disk recording and/or reproducing device advantageous for producing a silent disk drive device can be realized with a simple configuration.

It should be understood by those skilled in the art that various modifications, combinations, sub-combinations and alterations may occur depending on design requirements and other factors insofar as they are within the scope of the appended claims or the equivalents thereof.

What is claimed is:

1. A disk recording and/or reproducing device comprising:
a disk tray having, in a main surface thereof, a concave disk housing portion in which and from which a disk-like recording medium to be put in and taken out;
a tray housing case to support the disk tray so as to be movable in a direction in which the disk tray is inserted and ejected; and
a disk cover which is mounted to the tray housing case and which covers over the disk housing portion of the disk tray when the disk tray is housed in the tray housing case, wherein the disk cover includes an annular contact portion provided at an outer periphery thereof, extending outwardly and continuous in a circumferential direction thereof, wherein a dimension of a width of the annular contact portion in a direction orthogonal to the circumferential direction thereof is larger than a dimension of a thickness of the disk cover, and the disk cover is configured such that the annular contact portion is brought into contact with an entire periphery of the disk housing portion of the disk tray.

2. The disk recording and/or reproducing device according to claim 1, wherein the disk housing portion includes a side surface wall continuous in a circumferential direction of the disk housing portion in an inner circumference surface thereof, and wherein a portion of the side surface wall is provided with a cutout for exposing a part of an outer periphery of the disk-like recording medium placed in the disk housing portion.

3. The disk recording and/or reproducing device according to claim 1, wherein the disk cover is made of sheet metal and covers an entire surface of the main surface having the disk housing portion of the disk tray, a bulging portion having a size corresponding to the disk housing portion is provided in the disk cover, and the annular contact portion is provided to an outer periphery of the bulging portion of the disk cover.

4. The disk recording and/or reproducing device according to claim 3, wherein the sheet metal of the disk cover has a thickness equal to or less than 0.5 mm.

5. The disk recording and/or reproducing device according to claim 1, further comprising an elastic member to bias the disk cover onto the main surface of the disk tray in the tray housing case or the disk cover.

6. The disk recording and/or reproducing device according to claim 5, wherein the elastic member includes a plate spring fixed to the tray housing case or the disk cover, and the plate spring presses the annular contact portion of the disk cover.

* * * * *